(12) United States Patent
Sun

(10) Patent No.: US 12,365,377 B2
(45) Date of Patent: Jul. 22, 2025

(54) TROLLEY

(71) Applicant: Zhejiang Pride Leisure Products Co., Ltd., Jinhua (CN)

(72) Inventor: Benlong Sun, Jinhua (CN)

(73) Assignee: ZHEJIANG PRIDE LEISURE PRODUCTS CO., LTD., Zhejiang Province (CN)

( * ) Notice: Subject to any disclaimer, the term of this patent is extended or adjusted under 35 U.S.C. 154(b) by 473 days.

(21) Appl. No.: 17/815,951

(22) Filed: Jul. 29, 2022

(65) Prior Publication Data

US 2023/0227087 A1    Jul. 20, 2023

(30) Foreign Application Priority Data

Jan. 17, 2022 (CN) .......................... 202210047353.1

(51) Int. Cl.
*B62B 3/02* (2006.01)
*B62B 3/00* (2006.01)

(52) U.S. Cl.
CPC ................ *B62B 3/02* (2013.01); *B62B 3/002* (2013.01)

(58) Field of Classification Search
CPC ........... B62B 3/02; B62B 3/002; B62B 3/007; B62B 3/025; B62B 3/005; B62B 3/022; B62B 3/00; B62B 5/067; B62B 5/064; B62B 5/06; B62B 2205/06; B62B 2205/02; B62B 2301/044; B62B 2301/05; B62B 2301/04
See application file for complete search history.

(56) References Cited

U.S. PATENT DOCUMENTS

| | | | | |
|---|---|---|---|---|
| 8,002,363 B2 * | 8/2011 | Cheng | ................ | B60B 33/0068 |
| | | | | 301/121 |
| 9,056,621 B1 * | 6/2015 | Jin | .......................... | B62B 3/027 |
| 9,073,564 B2 * | 7/2015 | Yang | ....................... | B62B 3/002 |
| 9,211,897 B2 * | 12/2015 | Yang | ....................... | B62B 3/001 |
| 9,580,095 B2 * | 2/2017 | Vargas, II | ................. | B62B 3/02 |
| 9,738,298 B1 * | 8/2017 | Yang | ....................... | B62B 3/025 |
| 10,040,470 B1 * | 8/2018 | Horowitz | ................ | B62B 3/102 |
| 10,099,711 B1 * | 10/2018 | Sun | .......................... | B62B 3/007 |
| 10,099,712 B1 * | 10/2018 | Sun | .......................... | B62B 5/067 |
| 10,399,586 B1 * | 9/2019 | Huang | ....................... | B62B 5/06 |
| 10,633,010 B1 * | 4/2020 | Zhang | ....................... | B62B 3/025 |
| 10,836,418 B2 * | 11/2020 | Zhu | ......................... | B62B 3/025 |
| 10,953,903 B1 * | 3/2021 | Park | ......................... | B62B 3/007 |
| 10,953,904 B1 * | 3/2021 | Sun | .......................... | B62B 3/002 |
| 11,332,178 B2 * | 5/2022 | Yang | ....................... | B62B 5/067 |

(Continued)

*Primary Examiner* — James M Dolak
(74) *Attorney, Agent, or Firm* — WPAT LAW, P.C.; Anthony King

(57) ABSTRACT

A novel trolley comprises a foldable frame, a handle mounted behind the frame, and four wheel assemblies mounted at four corners of the frame. The frame comprises a frame body consisting of a front wall assembly, a rear wall assembly and two side wall assemblies, as well as a bottom frame assembly located at the bottom of the frame body. Each side wall assembly comprises two connecting rods. Each connecting rod comprises two long rods, two medium rods and two short rods, wherein lower ends of the two long rods are rotatably connected to form a V-shape that is open upwards, and upper ends of the two long rods are rotatably connected to an upper end of the front wall assembly and an upper end of the rear wall assembly respectively.

11 Claims, 4 Drawing Sheets

(56) References Cited

U.S. PATENT DOCUMENTS

| | | | |
|---|---|---|---|
| 11,370,467 B1* | 6/2022 | Horowitz | B62B 3/007 |
| 11,851,097 B2* | 12/2023 | Chu | B62B 3/007 |
| 11,932,298 B2* | 3/2024 | Sun | B62B 3/007 |
| 11,958,520 B1* | 4/2024 | Sun | B62B 5/067 |
| 12,012,139 B2* | 6/2024 | Sun | B62B 3/007 |

* cited by examiner

TROLLEY

BACKGROUND OF THE INVENTION

1. Technical Field

The invention belongs to the technical field of trolleys, and particularly relates to a novel trolley.

2. Description of Related Art

Trolleys are easy to operate, convenient to use, high in passing ability, and capable of being used in different complex environments, thus having been widely used in life and production. The frame, as an important constituent part, of the trolleys, determines the performance of the trolleys. However, the frame of traditional trolleys is complex in structure, large in size and inconvenient to use, and cannot be disassembled or folded, so the traditional trolleys cannot be used to convey goods in different environments, cannot be folded to be stored before and after use, and are more difficult to carry and use. A storage platform of the frame of the traditional trolleys cannot be detached or be installed firmly, and may fall during use or cause damage to articles. So, it is necessary to improve the traditional trolleys.

BRIEF SUMMARY OF THE INVENTION

The objective of the invention is to overcome the above-mentioned defects by providing a novel trolley, which can be folded to be stored before and after use, is convenient to carry, simple in structure, and easy to operate.

To fulfill the above objective, the invention adopts the following technical solution: a novel trolley comprises a foldable frame, a handle mounted behind the frame, and four wheel assemblies mounted at four corners of the frame, wherein the frame comprises a frame body consisting of four sides which are a front wall assembly, a rear wall assembly and two side wall assemblies, as well as the bottom frame assembly located at the bottom of the frame body, each side wall assembly comprises two connecting rods; each connecting rod comprises two long rods, two medium rods and two short rods, wherein lower ends of the two long rods are rotatably connected to form a V-shape that is open upwards, and upper ends of the two long rods are rotatably connected to an upper end of the front wall assembly and an upper end of the rear wall assembly respectively; an upper end of one medium rod is rotatably connected to an upper end of one short rod to form a V-shape that is open downwards, lower ends of the two medium rods are rotatably connected to a lower end of the front wall assembly and a lower end of the rear wall assembly respectively, and upper sections of the two medium rods are riveted on upper sections of the two long rods respectively; and lower ends of the two short rods are riveted on lower sections of the two long rods respectively.

Further, the two long rods are rotatably connected through a connector; or, each medium rod and the corresponding short rod are rotatably connected through a connector.

Furthermore, the connector comprises a left connecting piece and a right connecting piece which are symmetrical in structure, one end of the left connecting piece is rotatably connected to one end of the right connecting piece, and the other end of the left connecting piece or the other end of the right connecting piece is fixed to one long rod or one medium rod or one short rod.

Further, the front wall assembly and the rear wall assembly are identical in structure; the front wall assembly comprises two telescopic rods, two long tubes, two short tubes and two connecting tubes; upper connecting bases are disposed at upper ends of the telescopic rods, and lower connecting bases are disposed at lower ends of the telescopic rods; upper ends of the two long tubes are rotatably connected to form a V-shape that is open downwards, and lower ends of the two long tubes are rotatably connected to the two lower connecting bases respectively, lower ends of the two short tubes, which are arranged symmetrically, are riveted on upper sections of the two long tubes; upper ends of the two short tubes, which are arranged symmetrically, are rotatably connected to the two upper connecting bases respectively, one ends of the two connecting tubes are rotatably connected, and the other ends of the two connecting tubes are riveted on middle portions of the two long tubes respectively; the upper connecting bases are rotatably connected to the upper ends of the long rods of one side wall assembly, and the lower connecting bases are rotatably connected to the lower ends of the medium rods of one side wall assembly; and each lower connecting base is rotatably connected to a corner of the bottom frame assembly. The four sides of the whole frame are of a foldable structure, such that the frame can be folded to be stored to occupy less space when the novel trolley is not used, and the assembly process is simpler; and after the four sides are assembled, a trolley cloth can be assembled in the frame body.

Furthermore, a fastener for assembly and fixing the trolley cloth is disposed at the top of each upper connecting base. The four corners of the trolley cloth are disassembled and fixed through the fasteners, such that the trolley cloth can be fixed more firmly and can be assembled easily, and the frame and the trolley cloth can be cleaned and assembled easily.

Furthermore, the fastener comprises a clamping piece and a U-shaped elastic piece inlaid in the clamping piece, and a protrusion on the U-shaped elastic piece stretches out of a horizontal hole of the clamping piece; and each upper connecting base is provided with a longitudinal mounting hole and a horizontal clamping hole, the fastener is disposed in the longitudinal mounting hole, and the protrusion stretches out of the horizontal clamping hole.

Furthermore, the novel trolley further comprises the trolley cloth assembled on the frame, mounting holes corresponding to the fasteners are formed in four corners of the trolley cloth, and sleeving portions to be disposed around joints of the medium rods and the short rods are disposed on any two symmetrical sides of the trolley cloth. After the four corners of the trolley cloth are fixed to the four corners of the frame, the sleeving portions on the two sides are disposed around the connectors on sides of the frame, such that the force-bearing area is enlarged, the trolley cloth can be better supported by the frame, and the trolley can convey more articles.

Furthermore, the bottom frame assembly comprises a bottom tube holder and four bottom tube, and each bottom tube has an end rotatably connected to the bottom tube holder and an end rotatably connected to one of four bottom corners of the frame body. When the trolley is to be folded, users just need to pull the bottom tube holder upwards, and then the trolley is folded to be stored.

Furthermore, grooves are formed in four bottom corners of the bottom tube holder, and one end of each bottom tube is inlaid and rotatably connected into a groove, such that the bottom tubes 91 can only rotate downwards within a range of about 90° to be folded and stored below the center of the bottom tube holder.

Furthermore, each wheel assembly comprises a wheel and a wheel carrier, and the wheels are detachably mounted at four bottom corners of the frame through the wheel carriers. By adoption of the detachable design, the wheel assemblies can be rapidly assembled and can be maintained and changed later.

Furthermore, each wheel carrier comprises a wheel stand, an axle and an axle clamping piece, wherein the axle, the wheel stand and the wheel are assembled sequentially, the axle clamping piece comprises an axle sleeve, a gasket and a pressure bearing which are sequentially disposed around the axle from top to bottom, and a bayonet at the top of the axle sleeve is inlaid in a groove in the top of the axle.

By adoption of the technical solution of the invention, the invention has the following beneficial effects: the trolley adopts two symmetrical sides of the same structure, so that the production process and the assembly process are simpler; the whole trolley can be folded to be stored and is novel in structure; and the trolley cloth is fixed on the frame through multiple mounting portions, such that disassembly is easy and fast, and the trolley is high in transport capacity, and easy and fast to use.

Figure 1:
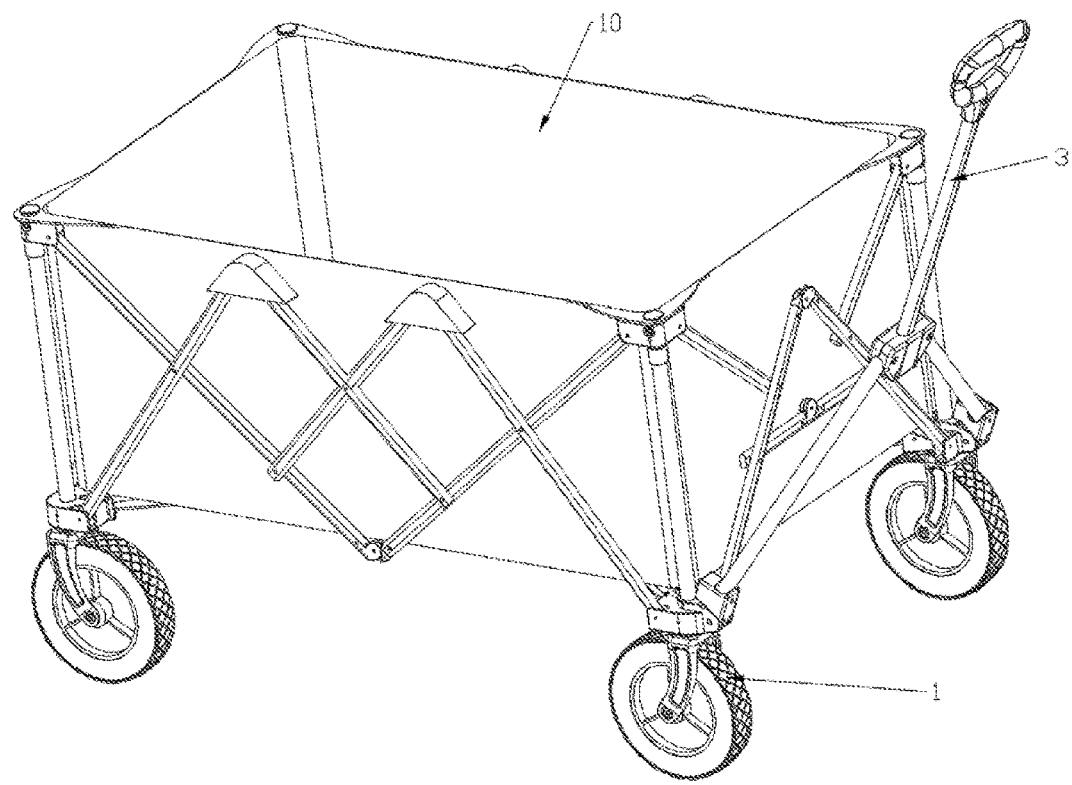
FIG. 1 is a three-dimensional diagram of a novel trolley.
Figure 2:
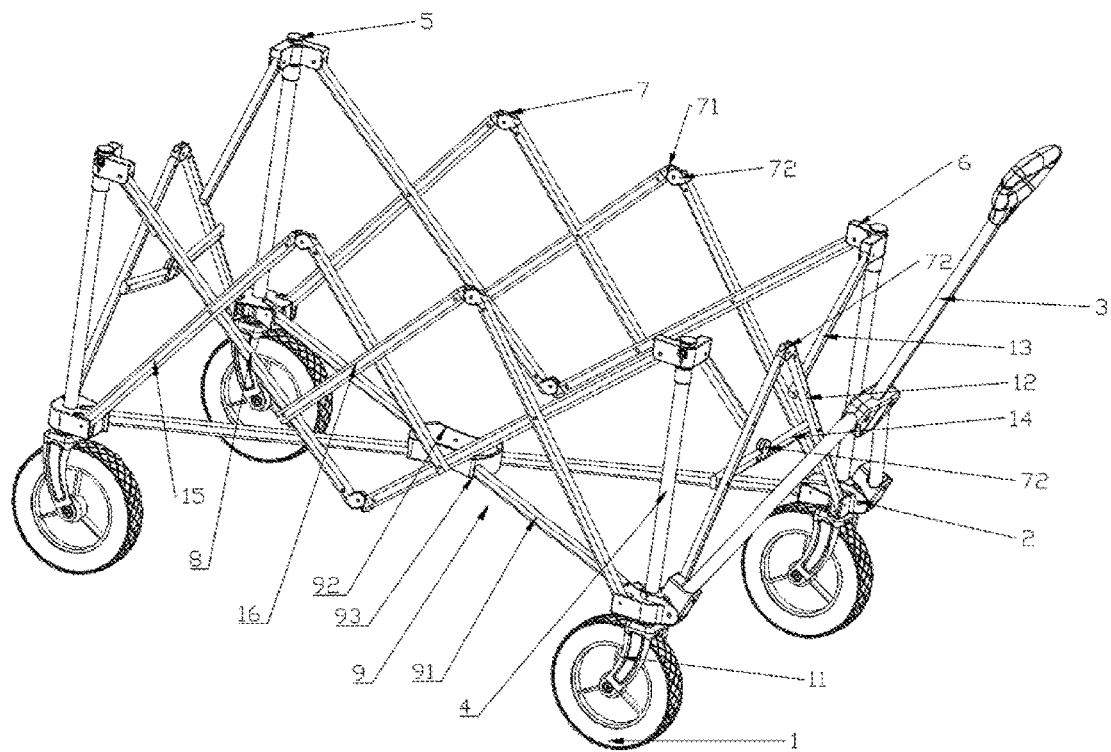
FIG. 2 is a schematic diagram of a frame in an unfolded state.
Figure 3:
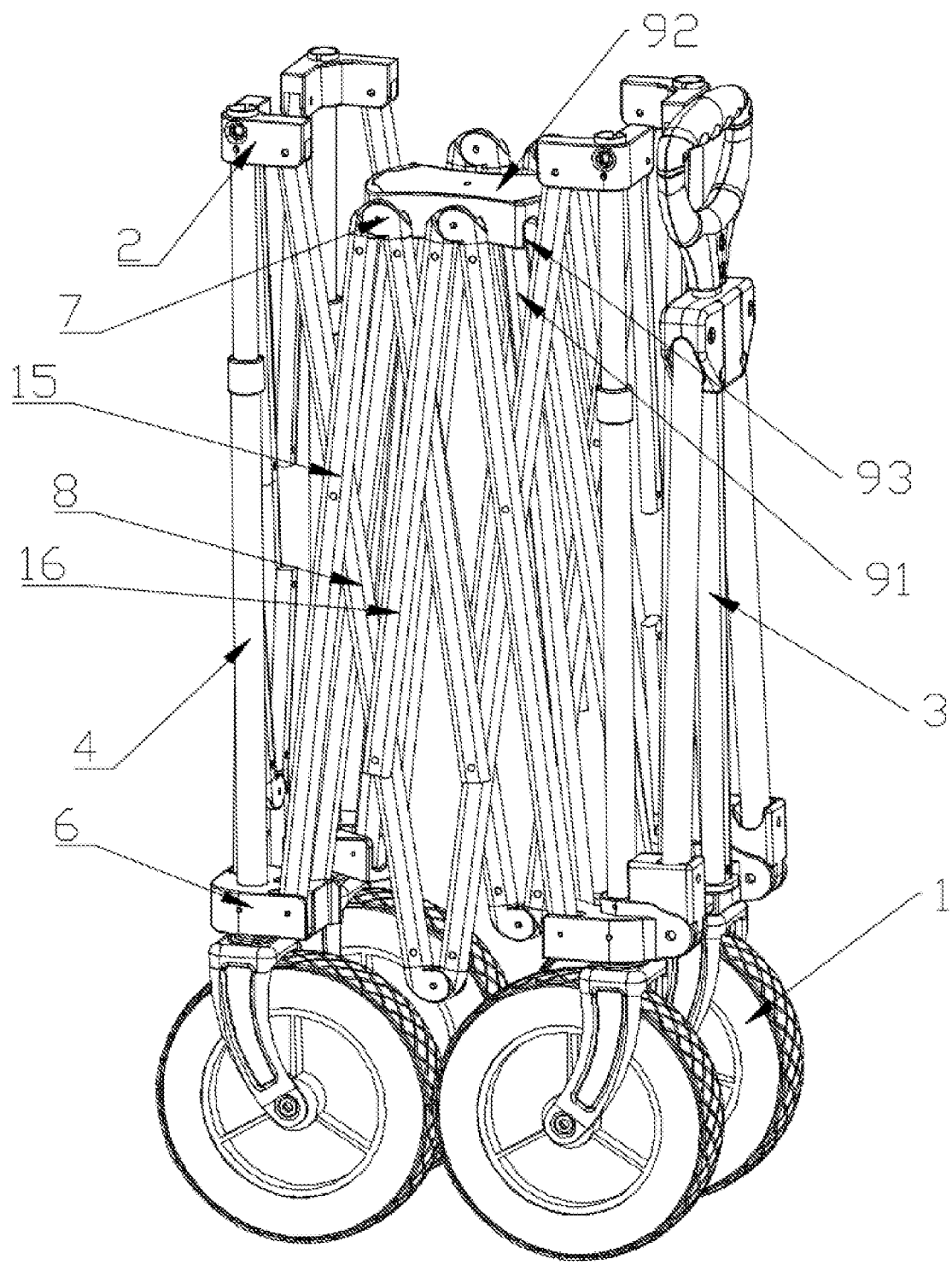
FIG. 3 is a schematic diagram of the frame in a folded state.
Figure 4:
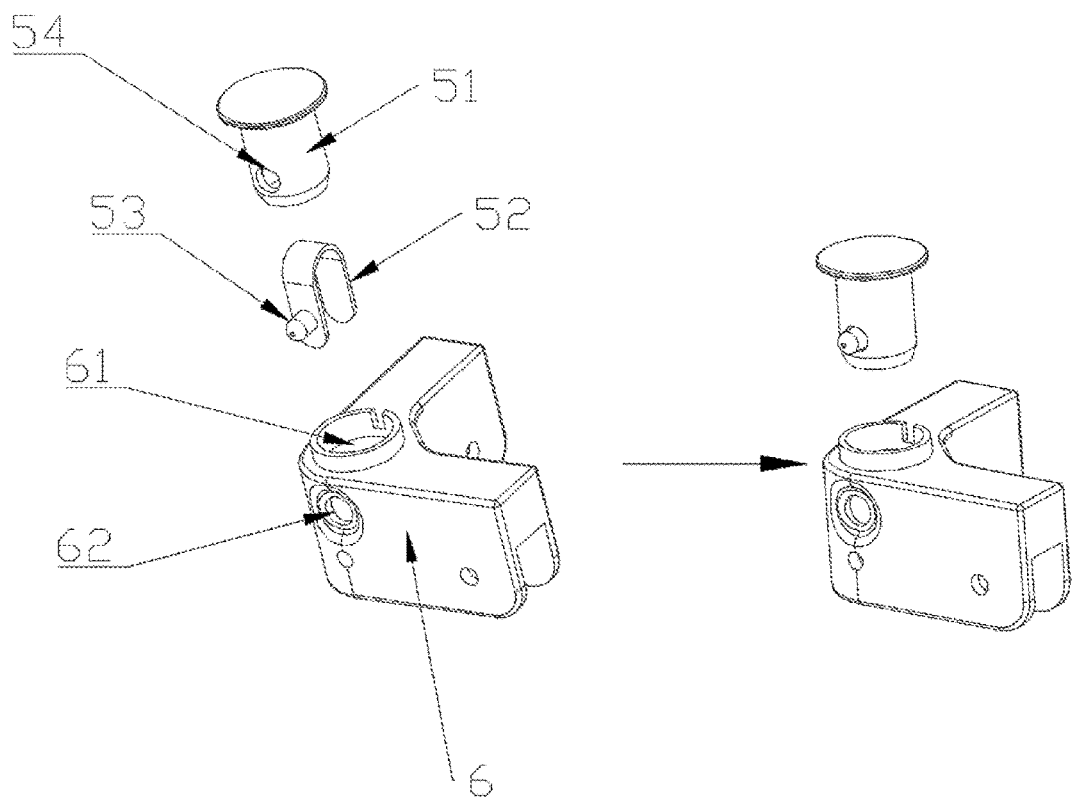
FIG. 4 is an assembly diagram of a fastener and an upper connecting base.
Figure 5:
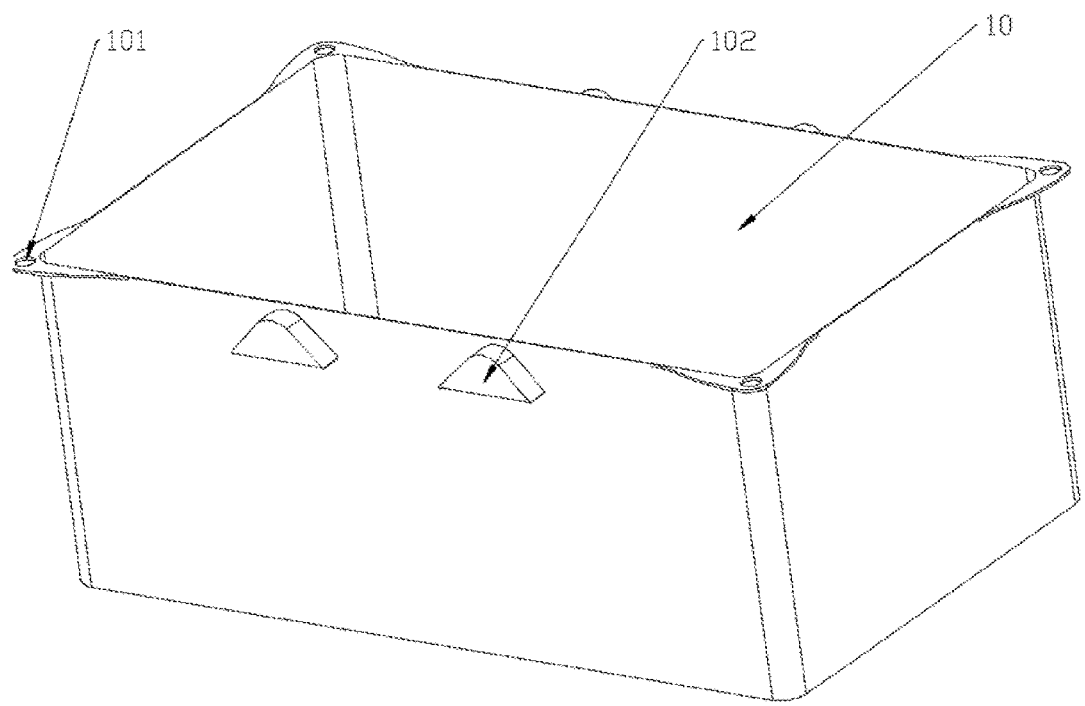
FIG. 5 is a three-dimensional diagram of a trolley cloth.

In the figures: 1, wheel; 2, lower connecting base; 3, handle; 4, telescopic rod; 5, fastener; 51, clamping piece; 52, U-shaped elastic piece; 53, protrusion; 54, horizontal hole; 6, upper connecting base; 61, longitudinal mounting hole; 62, horizontal clamping hole; 7, connector; 71, left connecting piece; 72, right connecting piece; 8, long rod; 9, bottom frame assembly; 91, bottom tube; 92, bottom tube holder; 93, groove; 10, trolley cloth; 101, mounting hole; 102, sleeving portion; 11, wheel carrier; 111, wheel stand; 112, axle; 1120, groove; 113, axle sleeve; 1130, bayonet; 114, gasket; 115, pressure bearing; 12, long tube; 13, short tube; 14, connecting tube; 15, medium rod; 16, short rod.

DETAILED DESCRIPTION OF THE INVENTION

Specific embodiments of the specific solution of the invention will be further expounded in conjunction with the accompanying drawings to gain a better understanding of the technical solution.

As shown in FIG. 1-FIG. 5, a novel trolley comprises a foldable frame, a handle 3, and four wheel assemblies 1, wherein the handle 3 is mounted behind the frame, the four wheel assemblies 1 are mounted at four corners of the frame, and the frame comprises a frame body consisting of four sides which are a front wall assembly, a rear wall assembly and two side wall assemblies respectively, as well as a bottom frame assembly 9 located at a bottom of the frame body. Wherein, the two side wall assemblies are identical in structure. Each side wall assembly comprises two long rods 8, two medium rods 15 and two short rods 16, wherein lower ends of the two long rods 8 are rotatably connected to form a V-shape that is open upwards, and upper ends of the two long rods 8 are rotatably connected to an upper end of the front wall assembly and an upper end of the rear wall assembly respectively; an upper end of one medium rod 15 is rotatably connected to an upper end of one short rod 16 to form a V-shape that is open upwards, lower ends of the two medium rods 15 are rotatably connected to a lower end of the front wall assembly and a lower end of the rear wall assembly respectively, and upper sections of the two medium rods 15 are riveted on upper sections of the two long rods 8 respectively; and lower ends of the two short rods 16 are riveted on lower sections of the two long rods 8 respectively. The long rods 8, the medium rods 15 and the short rods 16 are preferably hollow tubes, and are connected to form three V-shaped structures, which make the side wall assemblies foldable. A trolley cloth 10 is mounted on joints of the upper sections of the medium rods 15 and the upper sections of the short rods 16.

In this embodiment, the front wall assembly and the rear wall assembly are identical in structure. The front wall assembly comprises two telescopic rods 4, two long tubes 12, two short tubes 13 and two connecting tubes 14, wherein upper connecting bases 6 are disposed at upper ends of the telescopic rods 4, lower connecting bases 2 are disposed at lower ends of the telescopic rods 4, upper ends of the two long tubes 12 are rotatably connected through a connector 7, lower ends of the two long tubes 12 are rotatably connected to the lower connecting bases 2, lower ends of the two short tubes 13, which are arranged symmetrically, are riveted on upper sections of the two long tubes, upper ends of the two short tubes 13 are rotatably connected to the upper connecting bases 6, one ends of the two connecting tubes 14 are rotatably connected, the other ends of the two connecting tubes 14 are riveted on middle portions of the two long tubes 12 respectively; and each upper connecting base 6 is rotatably connected to the upper end of one side wall assembly, and each lower connecting base 2 is rotatably connected to the lower end of one side wall assembly; and each lower connecting base 2 is also rotatably connected to one corner of the bottom frame assembly 9. The front wall assembly or the rear wall assembly is rotatably connected to the side wall assemblies.

According to one preferred implementation, the two long rods 8 in this embodiment are rotatably connected through a connector 7; or, each medium rod 15 and the corresponding short rod 16 in this embodiment are rotatably connected through a connector 7; or, the two long tubes 12 in this embodiment are rotatably connected through a connector 7.

According to one preferred implementation, the connector 7 comprises a left connecting piece 71 and a right connecting piece 72 which are symmetrical in structure, wherein one end of the left connecting piece 71 is rotatably connected to one end of the right connecting piece 72, the other end of the left connecting piece 71 or the other end of the right connecting piece 72 is fixed to an end of one long rod 8, one short rod 16 or one medium rod 15. In each way, rotatable connection of the side wall assemblies, or the front wall assembly or the rear wall assembly can be realized through the connectors 72 consisting of the left connecting pieces 71 and the right connecting pieces 72, and each side of the frame can be folded or unfolded.

According to one preferred implementation, the bottom frame assembly comprises a bottom tube holder 92 and four bottom tubes 91, wherein one end of each bottom tube 91 is rotatably connected to the bottom tube holder 92, and the other end of each bottom tube 91 is rotatably connected to one of four bottom corners of the frame body. When the novel trolley is to be folded, users just need to pull the bottom tube holder 92 upwards to enable the bottom tubes 91 to drive the four corners of the frame body to draw close to each other towards the middle, such that the novel trolley is folded.

According to one preferred implementation, grooves 93 are formed in four bottom corners of the bottom tube holder 92 and do not extend to an upper surface of the bottom tube holder 92, and one end of each bottom tube 91 is inlaid and rotatably connected into one groove 93, such that the bottom tubes 91 can only rotate downwards within a range of about 90°.

According to one preferred implementation, each wheel assembly 1 comprises a wheel 1 and a wheel carrier 11, wherein the wheel 41 is mounted on the telescopic rod at a lower end of the wheel carrier 11, and an upper end of the wheel carrier 11 is detachably mounted at the bottom of the lower connecting base 2 of the frame.

Figure 6:
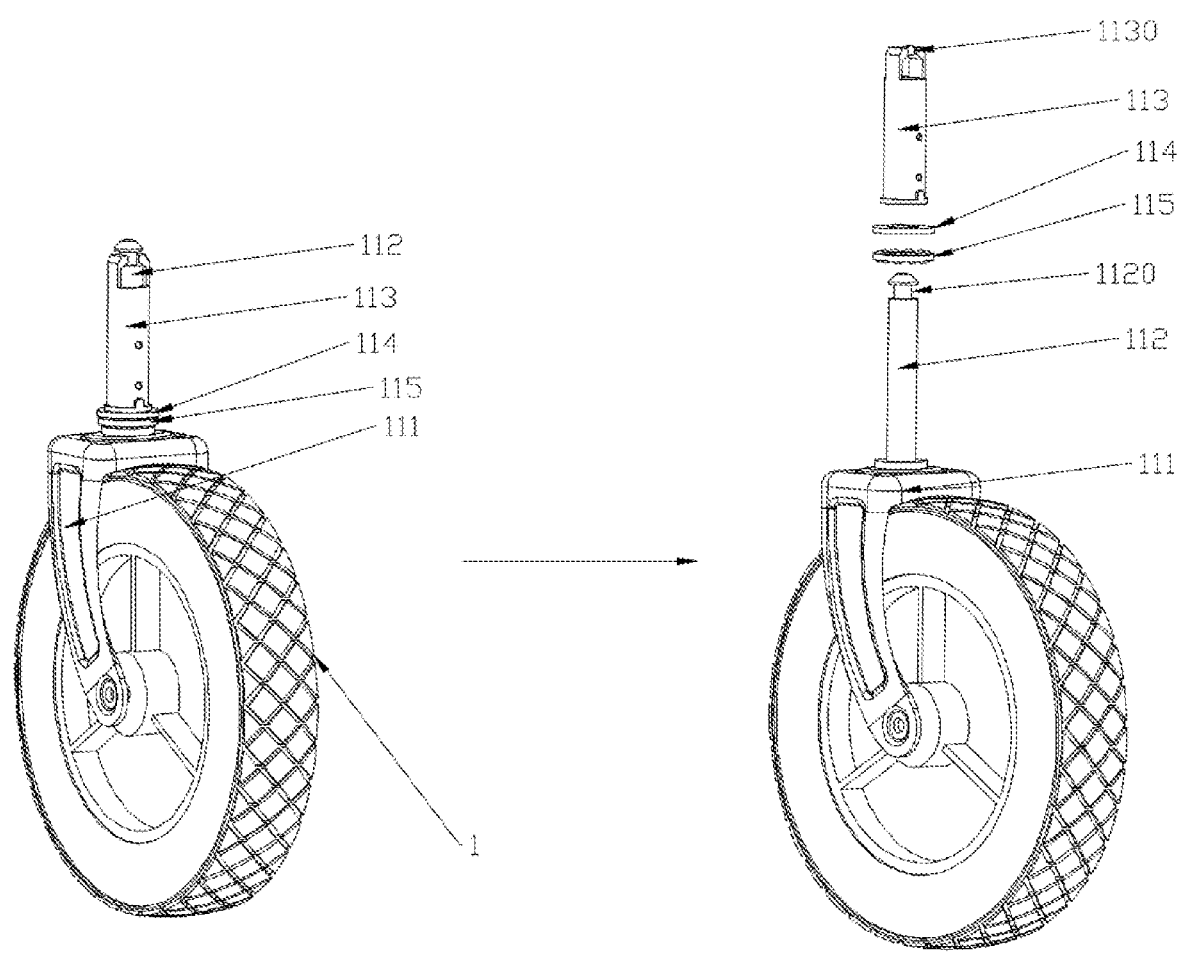
FIG. 6 is an assembly diagram of a wheel carrier.

This embodiment provides a specific wheel carrier which, as shown in FIG. 6, comprises a wheel stand 111, an axle 112 and an axle clamping piece, wherein the axle 112, the wheel stand 111 and the wheel 1 are assembled sequentially, the axle clamping piece comprises an axle sleeve 113, a gasket 114 and a pressure bearing 115 which are sequentially disposed around the axle 112 from top to bottom, and a bayonet 1130 at the top of the axle sleeve 113 is inlaid in a groove 1120 in the top of the axle 112. The axle sleeve 113 at the upper end of the whole wheel carrier and the axle 112 in the axle sleeve 113 are inserted from the bottom of one telescopic rod 4, such that the wheel 1 is assembled on the whole frame.

To assemble the trolley cloth on the frame, a fastener 5 for assembling and fixing the trolley cloth is disposed at the top of the upper connecting base 6 at the upper end of each telescopic rod 4. In this way, the four corners of the trolley cloth 10 can be firmly assembled at the four corners of the frame.

In this embodiment, the fastener 5 comprises a clamping piece 51 and a U-shaped elastic piece 52 inlaid in the clamping piece, and a protrusion 53 on the U-shaped elastic piece 52 stretches out of a horizontal hole 54 of the clamping piece 51. The upper connecting bases 6 are provided with longitudinal mounting holes 61 and horizontal clamping holes 62, the fasteners are disposed in the longitudinal mounting holes 61, and the protrusions 53 stretch out of the horizontal clamping holes 62. When the trolley cloth is disassembled, the protrusions 53 on side faces of the upper connecting bases 6 are pressed inwards to detach the fasteners 5 from the upper connecting bases 6; and after the trolley cloth 10 is assembled, the fasteners 5 are clamped in the longitudinal mounting holes 61 again.

According to one preferred implementation, the novel trolley further comprises a trolley cloth 10 disposed on the frame, and mounting holes 101 corresponding to the fasteners 5 are disposed at four corners of the trolley cloth. The trolley cloth 10 is assembled in the frame, and then the fasteners 5 penetrate through the mounting holes 101 to be fixed in the longitudinal mounting holes 61 of the upper connecting bases 6. Sleeving portions 102 to be disposed around the sides of the frame are arranged on two sides, corresponding to the side wall assemblies, of the trolley cloth 10. After the four corners of the trolley cloth 10 are disposed at the four corners of the frame, the fasteners 5 penetrate through the mounting holes 101 to fix the trolley cloth 10 on the frame, the sleeving portions 102 are disposed around the connectors 72 of the side wall assemblies of the frame, such that the force-bearing area is enlarged, and the novel trolley can convey more articles.

According to one preferred implementation, the handle 3 is preferably a foldable handle as shown in the figures, and comprises a pull rod and two connecting rods disposed at the lower end of the pull rod, wherein upper ends of the two connecting rods are rotatably connected to the pull rod, and lower ends of the two connecting rods are rotatably connected to the two lower connecting bases 2 of the rear wall assembly respectively. The two connecting rods both rotate in a left-right direction, and can be drawn together when folded.

It should be noted that the above embodiments are merely preferred ones of the invention and employ the technical principle of the invention. Those skilled in the art should appreciate that the invention is not limited to the specific embodiments described herein, and can make different obvious variations, readjustments and substitutions without departing from the protection scope of the invention. Thus, although the invention has been described in detail with reference to the above embodiments, the invention is not limited to these embodiments, and may include more other equivalent embodiments without departing from the concept of the invention, and the scope of the invention should be determined by the scope of the appended claims.

What is claimed is:

1. A novel trolley comprising:
   a foldable frame,
   a handle mounted behind the foldable frame, and
   four wheel assemblies mounted at four corners of the foldable frame,
   the foldable frame comprising:
      a frame body consisting of four sides which are a front wall assembly, a rear wall assembly, two side wall assemblies, and
      a bottom frame assembly located at a bottom of the frame body,
      wherein each of said two side wall assemblies comprise:
         two connecting rods, each of said two connecting rods comprise two long rods, two medium rods and two short rods,
         wherein lower ends of the two long rods are rotatably connected to form a V-shape that is open upwards, and upper ends of the two long rods are rotatably connected to an upper end of the front wall assembly and an upper end of the rear wall assembly respectively;
         an upper end of one of said two medium rods is rotatably connected to an upper end of one of said two short rods to form a V-shape that is open downwards,
         lower ends of the two medium rods are rotatably connected to a lower end of the front wall assembly and a lower end of the rear wall assembly respectively,
         upper sections of the two medium rods are riveted on upper sections of the two long rods respectively; and
         lower ends of the two short rods are riveted on lower sections of the two long rods respectively;
      wherein the front wall assembly and the rear wall assembly are identical in structure; the front wall assembly comprises two telescopic rods, two long tubes, two short tubes and two connecting tubes; upper connecting bases are disposed at upper ends of the telescopic rods, and lower connecting bases are disposed at lower ends of the telescopic rods; upper ends of the two long tubes are rotatably connected to form a V-shape that is open downwards, and lower ends of the two long tubes are rotatably connected to the two lower connecting bases respectively; lower ends of the two short tubes, which are arranged symmetrically, are riveted on upper sections of the two long tubes; upper ends of the two short tubes, which are arranged symmetrically, are rotatably connected to the two upper connecting bases respectively; one end of each of the two connecting tubes are rotatably connected, and another end of each of the two connecting tubes are riveted on middle portions of the two long tubes respectively;

the upper connecting bases are rotatably connected to the upper ends of the long rods of one side wall assembly, and the lower connecting bases are rotatably connected to the lower ends of the medium rods of one side wall assembly; and each lower connecting base is rotatably connected to a corner of the bottom frame assembly;

wherein a fastener for assembling and fixing a trolley cloth is disposed at a top of each upper connecting base; and wherein each fastener comprises a clamping piece and a U-shaped elastic piece inlaid in the clamping piece, and a protrusion on the U-shaped elastic piece stretches out of a horizontal hole of the clamping piece; and each upper connecting base is provided with a longitudinal mounting hole and a horizontal clamping hole, the fastener is disposed in the longitudinal mounting hole, and the protrusion stretches out of the horizontal clamping hole.

2. The novel trolley according to claim 1, wherein the two long rods are rotatably connected through a connector; or, each medium rod and the corresponding short rod are rotatably connected through a connector.

3. The novel trolley according to claim 2, wherein the connector comprises a left connecting piece and a right connecting piece which are symmetrical in structure, an end of the left connecting piece is rotatably connected to an end of the right connecting piece, and another end of the left connecting piece or another end of the right connecting piece is fixed to one said long rod or one said medium rod or one said short rod.

4. The novel trolley according to claim 1, further comprising the trolley cloth assembled on the frame, mounting holes corresponding to the fasteners are formed in four corners of the trolley cloth, and sleeving portions to be disposed around joints of the medium rods and the short rods are disposed on any two symmetrical sides of the trolley cloth.

5. The novel trolley according to claim 1, wherein the bottom frame assembly comprises a bottom tube holder and four bottom tubes, and each bottom tube has an end rotatably connected to the bottom tube holder and an end rotatably connected to one of four bottom corners of the frame body.

6. The novel trolley according to claim 1, wherein each wheel assembly comprises a wheel and a wheel carrier, and the wheels are detachably mounted at four bottom corners of the frame through the wheel carriers.

7. The novel trolley according to claim 6, wherein each said wheel carrier comprises a wheel stand, an axle and an axle clamping piece, the axle, the wheel stand and the wheel are assembled sequentially, the axle clamping piece comprises an axle sleeve, a gasket and a pressure bearing which are sequentially disposed around the axle from top to bottom, and a bayonet at a top of the axle sleeve is inlaid in a groove in a top of the axle.

8. The novel trolley according to any one of claim 2, wherein each said wheel assembly comprises a wheel and a wheel carrier, and the wheels are detachably mounted at four bottom corners of the frame through the wheel carriers.

9. The novel trolley according to claim 8, wherein each said wheel carrier comprises a wheel stand, an axle and an axle clamping piece, the axle, the wheel stand and the wheel are assembled sequentially, the axle clamping piece comprises an axle sleeve, a gasket and a pressure bearing which are sequentially disposed around the axle from top to bottom, and a bayonet at a top of the axle sleeve is inlaid in a groove in a top of the axle.

10. The novel trolley according to any one of claim 3, wherein each said wheel assembly comprises a wheel and a wheel carrier, and the wheels are detachably mounted at four bottom corners of the frame through the wheel carriers.

11. The novel trolley according to claim 10, wherein each said wheel carrier comprises a wheel stand, an axle and an axle clamping piece, the axle, the wheel stand and the wheel are assembled sequentially, the axle clamping piece comprises an axle sleeve, a gasket and a pressure bearing which are sequentially disposed around the axle from top to bottom, and a bayonet at a top of the axle sleeve is inlaid in a groove in a top of the axle.

\* \* \* \* \*